A. C. ANDRE.
Horse Corn-Planter.
No. 217,191.                        Patented July 8, 1879.
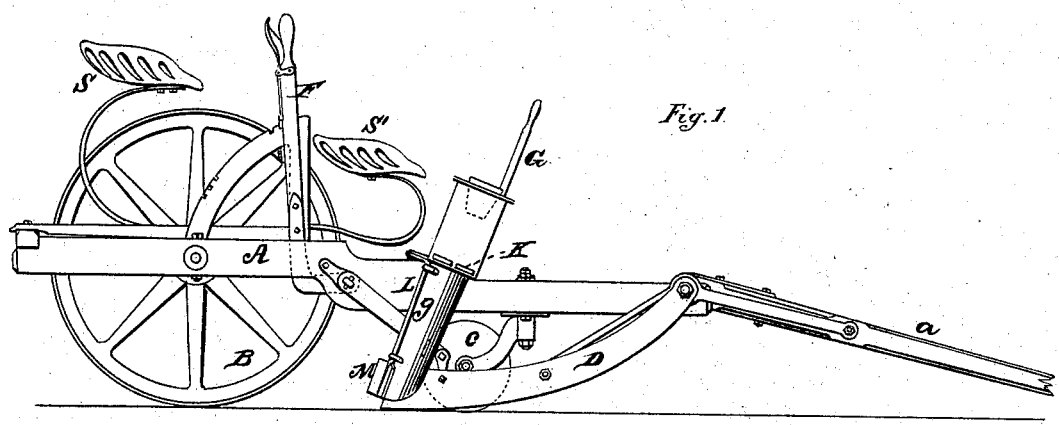
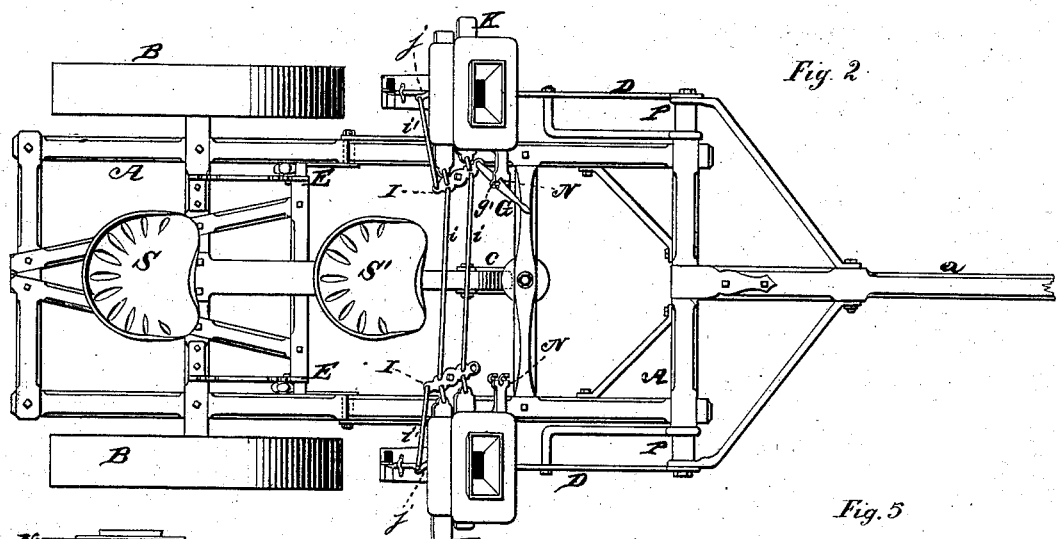
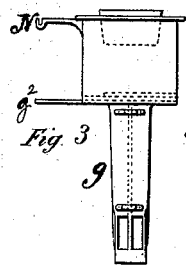
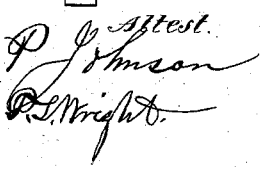
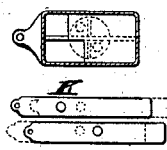
Attest:
P. Johnson
D. L. Wright
Inventor
Addison C. Andre
by
W. H. Babcock
Attorney.

UNITED STATES PATENT OFFICE.

ADDISON C. ANDRE, OF TURTLE, WISCONSIN.

IMPROVEMENT IN HORSE CORN-PLANTERS.

Specification forming part of Letters Patent No. 217,191, dated July 8, 1879; application filed March 20, 1879.

*To all whom it may concern:*

Be it known that I, ADDISON C. ANDRE, of the town of Turtle, of Rock county, in the State of Wisconsin, have invented certain new and useful Improvements in Horse Corn-Planters; and I hereby declare the following description and accompanying drawings are sufficient to enable any person skilled in the art or science to which it most nearly appertains to make and use my said invention or improvements without further invention or experiment.

This invention relates to horse corn-planters; and consists in the construction, combination, and arrangement of the devices hereinafter particularly described, and pointed out in the claim.

In the accompanying drawings, Figure 1 represents a side elevation of my improved horse corn-planter. Fig. 2 represents a top or plan view of the same. Figs. 3, 4, 5, and 6 represent detail views of the dropping devices.

In said drawings, A designates the frame of the machine; $a$, the tongue; B, the transporting-wheels; S, the rear seat; S', the front seat; $c$, the adjustable caster-wheel; D, the shoes or openers, and $g$ seed-boxes terminating in the dropper-tubes or foot-spouts. F designates the two adjusting-levers, which are pivoted to the frame A, and have their lower ends connected by a succession of pivoted links with the rear ends of shoes D, so that when said levers are rocked backward said shoes are lifted on their pivoted forward ends. Levers F are locked in any position of such adjustment by pawls and fixed segments in the usual manner.

The upper end of each seed-box $g$ is provided with an inwardly-extending arm or bar, which terminates in a bifurcated bracket, N, which is curved, so as to afford a horizontal bearing for studs $g^1$ on the sides of a detachable lever, G, which works transversely to the line of draft. Said seed-boxes are also provided at a lower point with inwardly-extending plates $g^2$, each of which sustains a horizontal plate, I, pivoted thereto by the middle. The corresponding ends of these plates are connected by rods $i$ $i$, so that the horizontal rocking of either plate transmits similar motion to the other. Each plate operates alternately two feed-slides, K, (shown in detail in Fig. 6,) which work across parallel compartments in the bottom of the seed-box proper, Fig. 5, and above the entrance to the top of the dropping-tube. This tube is divided into two parallel passages, down which the grain passes to the outlets at the bottom thereof. These outlets are closed alternately by the wings of dropping-gate M, on the lower part of vertical rock-shaft L, which is operated through a rod, $i'$, from plate I. The construction and arrangement of these devices are the same as applied to each seed-box.

Fig. 3 shows one of the seed-boxes, with its dropping-tube and fixed plates, detached from the rest of the machine. Fig. 4 shows the vertical shaft L and gate M detached.

The lever G can readily be detached from one side of the machine and applied to the other. A vertical movement upward or downward is all that is necessary. Thus the change is so rapid that it is not necessary to stop or retard the machine. It can be effected by one arm of the dropper.

By thus shifting the lever from side to side as the operator's arms alternately become tired the labor of dropping is made much less onerous. The detachable lever G in effect performs the work of two levers.

The seats S and S' are supported by opposite ends of the same bar, so that the weights of the occupants neutralize each other in a measure and lessen the strain on the fastenings of the seat-bar.

Having thus fully described my invention, what I claim as new, and desire to secure by Letters Patent, is—

In combination with detachable lever G and bearing-brackets N, the oscillating plates I I, slides K K, connecting-rods $i$ $i$ $i'$ $i'$, crank-arms $j$ $j$, shafts L L, winged gates M M, and the double dropping-tubes, the said parts being combined and arranged so that the slide and gate of each tube are operated simultaneously.

ADDISON C. ANDRE.

Witnesses:
P. JOHNSON,
T. L. WRIGHT.